United States Patent
Marti et al.

(10) Patent No.: US 10,416,625 B2
(45) Date of Patent: Sep. 17, 2019

(54) AGGREGATING USER ROUTINES IN AN AUTOMATED ENVIRONMENT

(71) Applicant: Apple Inc., Cupertino, CA (US)

(72) Inventors: Lukas M. Marti, San Jose, CA (US); Kevin P. McLaughlin, Mountain View, CA (US); Arun G. Mathias, Los Gatos, CA (US); Ronald Keryuan Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 816 days.

(21) Appl. No.: 14/856,265

(22) Filed: Sep. 16, 2015

(65) Prior Publication Data

US 2016/0132030 A1    May 12, 2016

Related U.S. Application Data

(60) Provisional application No. 62/057,724, filed on Sep. 30, 2014, provisional application No. 62/094,695, filed on Dec. 19, 2014.

(51) Int. Cl.
| | |
|---|---|
| *G05B 15/02* | (2006.01) |
| *H04L 12/28* | (2006.01) |
| *H04L 29/08* | (2006.01) |

(52) U.S. Cl.
CPC ............ *G05B 15/02* (2013.01); *H04L 12/282* (2013.01); *H04L 12/2829* (2013.01); *H04L 67/18* (2013.01); *H04L 2012/2841* (2013.01)

(58) Field of Classification Search
CPC ... G05B 15/02; H04L 12/282; H04L 12/2829; H04L 2012/2841; H04L 67/18
USPC ........................................................ 700/275
See application file for complete search history.

(56) References Cited

U.S. PATENT DOCUMENTS

| | | | |
|---|---|---|---|
| 8,214,061 | B2 | 7/2012 | Westrick, Jr. et al. |
| 8,255,090 | B2 | 8/2012 | Frader-Thompson et al. |
| 8,630,741 | B1 | 1/2014 | Matsuoka et al. |
| 8,909,950 | B1 | 12/2014 | Levchuk et al. |
| 8,989,910 | B1 | 3/2015 | Klots |
| 8,996,188 | B2 | 3/2015 | Frader-Thompson et al. |

(Continued)

FOREIGN PATENT DOCUMENTS

| | | |
|---|---|---|
| CN | 101459725 | 6/2009 |
| CN | 102736599 | 10/2012 |
| WO | 2013184108 | 12/2013 |

OTHER PUBLICATIONS

Weiss, Markus, et al., "Leveraging smart meter data to recognize home appliances," [online] 2012, [retrieved from the internet], <URL: www.im.ethz.ch/publications/weiss_Percom2012.pdf<, 8 pages.

(Continued)

*Primary Examiner* — Mohammad Ali
*Assistant Examiner* — Saad M Kabir
(74) *Attorney, Agent, or Firm* — Kilpatrick Townsend & Stockton LLP

(57) ABSTRACT

Automated behaviors in an environment can be implemented based on aggregation of individual user routines. For example, mobile devices used by users in the environment can provide information about the users' behavior patterns to a coordinator device that can be located in the environment. The coordinator device can analyze the information to detect an aggregate pattern that involves multiple mobile devices and/or multiple users. Based on a detected aggregate patterns, the coordinator can identify behaviors to automate.

22 Claims, 10 Drawing Sheets

(56) References Cited

U.S. PATENT DOCUMENTS

| | | |
|---|---|---|
| 9,274,512 B1 | 3/2016 | Zima |
| 9,351,381 B2 | 5/2016 | Verfuerth et al. |
| 9,432,210 B2 | 8/2016 | Bhargava et al. |
| 9,482,442 B1 | 11/2016 | Mengle et al. |
| 2007/0273307 A1 | 11/2007 | Westrick, Jr. et al. |
| 2008/0036591 A1 | 2/2008 | Ray |
| 2008/0177678 A1 | 7/2008 | Di Martini et al. |
| 2009/0195349 A1 | 8/2009 | Frader-Thompson et al. |
| 2010/0082169 A1 | 4/2010 | Crist et al. |
| 2010/0156665 A1 | 6/2010 | Krzyzanowski et al. |
| 2010/0286937 A1 | 11/2010 | Hedley |
| 2011/0185203 A1 | 7/2011 | Carlson et al. |
| 2011/0290893 A1 | 12/2011 | Steinberg |
| 2012/0054125 A1 | 3/2012 | Clifton et al. |
| 2012/0086562 A1 | 4/2012 | Steinberg |
| 2012/0131504 A1 | 5/2012 | Fadell et al. |
| 2012/0191257 A1 | 7/2012 | Corcoran et al. |
| 2012/0215369 A1 | 8/2012 | Desai et al. |
| 2012/0286723 A1 | 11/2012 | Ukita et al. |
| 2012/0316808 A1 | 12/2012 | Frader-Thompson et al. |
| 2013/0144445 A1 | 6/2013 | Steinberg |
| 2013/0218360 A1 | 8/2013 | Najewicz et al. |
| 2013/0262197 A1 | 10/2013 | Kaulgud et al. |
| 2014/0039690 A1 | 2/2014 | Steinberg |
| 2014/0070959 A1 | 3/2014 | Bhargava et al. |
| 2014/0074257 A1 | 3/2014 | Bhargava et al. |
| 2014/0084165 A1 | 3/2014 | Fadell et al. |
| 2014/0118148 A1 | 5/2014 | Edlund et al. |
| 2014/0136242 A1 | 5/2014 | Weekes et al. |
| 2014/0156028 A1 | 6/2014 | Subramaniam et al. |
| 2014/0191575 A1 | 7/2014 | Gaucher et al. |
| 2014/0201315 A1 | 7/2014 | Jacob et al. |
| 2014/0222954 A1 | 8/2014 | Vaccari et al. |
| 2014/0229018 A1 | 8/2014 | Steinberg |
| 2014/0266669 A1 | 9/2014 | Fadell et al. |
| 2014/0278051 A1 | 9/2014 | McGavran |
| 2015/0025698 A1 | 1/2015 | Strelec |
| 2015/0074228 A1 | 3/2015 | Drake |
| 2015/0081118 A1 | 3/2015 | Endrizzi et al. |
| 2015/0168001 A1 | 6/2015 | Steinberg |
| 2015/0168002 A1 | 6/2015 | Plitkins et al. |
| 2015/0168003 A1 | 6/2015 | Stefanski et al. |
| 2015/0222517 A1 | 8/2015 | McLaughlin et al. |
| 2015/0223416 A1 | 8/2015 | Eng et al. |
| 2015/0262132 A1 | 9/2015 | Miller et al. |
| 2015/0308084 A1 | 10/2015 | Thompson et al. |
| 2015/0308706 A1 | 10/2015 | Bunker et al. |
| 2015/0323915 A1 | 11/2015 | Warren et al. |
| 2015/0350031 A1 | 12/2015 | Burks |
| 2015/0351145 A1 | 12/2015 | Burks |
| 2016/0091540 A1 | 3/2016 | Marti et al. |
| 2016/0091871 A1 | 3/2016 | Marti et al. |
| 2016/0091872 A1 | 3/2016 | Marti et al. |
| 2016/0091879 A1 | 3/2016 | Marti et al. |
| 2016/0161310 A1 | 6/2016 | Leaders et al. |
| 2016/0224033 A1 | 8/2016 | Gingrich |
| 2017/0070842 A1 | 3/2017 | Kulp et al. |
| 2017/0222894 A1 | 8/2017 | Park et al. |

OTHER PUBLICATIONS

Mozer, Michael C., "Chapter 12 Lessons from an Adaptive Home," Smart Environments: Technologies, Protocols, and Applications, Published Online, Jan. 28, 2005, 15 pages.

Schweizer, D., "Learning Frequent and Periodic Usage Patterns in Smart Homes," Jan. 31, 2014, Master Thesis, University of Applied Sciences and Arts Northwestern Switzerland School of Business, 133 pages.

Iglesias, Felix, et al., "A Global Approach of Habit Profiles for Smart Home Control," Proceedings of BS2013, 13$^{th}$ Conference of International Building Performance Simulation Association, Chambery, France, Aug. 26-28, 2013, 8 pages.

Chen, Yi-Cheng, et al., "Significant Correlation Pattern Mining in Smart Homes," Association for Computing Machinery, May 20, 2015, [online], [retrieved from the internet], <URL: dl.acm.org/citation.cfm?id=2700484>, 20 pages.

Chen, Yi-Cheng, et al., "Mining Correlation Patterns among Appliances in Smart Home Environment," PAKDD 2014, Part II, LNAI 8444, pp. 222-233.

Jakkula, Vikramaditya, et al., "Temporal Pattern Discovery for Anomaly Detection in a Smart Home," Proceedings of the 3rd IET Conference on Intelligent Environments (IE 2007), 2007, pp. 339-345.

Fatima, Iram, et al., "A Unified Framework for Activity Recognition-Based Behavior Analysis and Action Prediction in Smart Homes," Sensors, 2013, vol. 13, pp. 2682-2699.

Chen, Chao, et al., "Energy Outlier Detection in Smart Environments," Artificial Intelligence and Smarter Living—The Conquest of Complexity, Papers from the 2011 AAAI Workshop (WS-11-07), 6 pages.

AGGREGATING USER ROUTINES IN AN AUTOMATED ENVIRONMENT

CROSS-REFERENCES TO RELATED APPLICATIONS

This application claims the benefit of U.S. Provisional Application No. 62/057,724, filed Sep. 30, 2014, and of U.S. Provisional Application No. 62/094,695, filed Dec. 19, 2014, the disclosures of which are incorporated by reference in their entirety.

The present disclosure is also related to the following commonly-owned applications: U.S. patent application Ser. No. 14/614,914, filed Feb. 5, 2015 (Published as 2015/0222517); U.S. patent application Ser. No. 14/725,891, filed May 29, 2015; U.S. patent application Ser. No. 14/725,912, filed May 29, 2015; and U.S. patent application Ser. No. 14/081,895, filed Nov. 15, 2013 (published as 2014/0278051), the disclosures of which are incorporated by reference in their entirety.

BACKGROUND

The present disclosure relates in general to an accessory management system and in particular to an automated environment that can implement automated behaviors based on aggregation of individual user routines.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable devices, such as thermostats, lighting devices, household appliances, etc. It is sometimes desirable to automate operation of such devices.

SUMMARY

An automated environment can allow users' mobile devices (and/or other "controllers") to control various other devices (referred to as "accessories") in the automated environment. The user can interact with an accessory by operating a controller that can communicate message to the accessory in response to user input. In some instances, accessory operation can be automated. For example, a controller can be programmed to automatically instruct an accessory to initiate a specific action when certain triggering conditions are met, such as turning on a heating system or changing a thermostat's target temperature at a particular time, or turning on a light if the controller detects an ambient light level below a threshold. One or more controller devices can also act as a "coordinator" to manage communications between multiple controllers and multiple accessories.

Certain embodiments of the present invention relate to techniques usable in an automated environment to implement automated behaviors based on aggregation of individual user routines. For example, users who frequent the automated environment (e.g., residents of a home) can have mobile devices (e.g., mobile phones, wearable devices, or the like) that they use as controllers for accessories in the automated environment. Some or all of the mobile devices can incorporate pattern detection logic to identify patterns in the user's behavior (e.g., going to particular places at particular times or invoking particular accessory functions at particular times). A coordinator can receive information about detected patterns from the mobile devices and can analyze the information to detect an aggregate pattern (i.e., a pattern involving multiple mobile devices and/or multiple users). Based on a detected aggregate pattern, the coordinator can identify an operational behavior to automate (e.g., turn off the lights when the last user goes to bed) and can implement the automated behavior, e.g., by establishing an automation rule that reflects the detected aggregate pattern.

The following detailed description together with the accompanying drawings will provide a better understanding of the nature and advantages of the present invention.

DETAILED DESCRIPTION

Certain embodiments of the present invention relate to techniques usable in an automated environment to implement automated behaviors based on aggregation of individual user routines (e.g., via pattern of individual user behaviors). For example, users who frequent the automated environment (e.g., residents of a home) can have mobile devices (e.g., mobile phones, wearable devices, or the like) that they use as controllers for accessories in the automated environment. Some or all of the mobile devices can incorporate pattern detection logic to identify patterns in the user's behavior (e.g., going to particular places at particular times or invoking particular accessory functions at particular times). A coordinator can receive information about detected patterns from the mobile devices and can analyze the information to detect an aggregate pattern (i.e., a pattern involving multiple mobile devices and/or multiple users). Based on a detected aggregate pattern, the coordinator can identify an operational behavior of one or more accessories to automate (e.g., turn off the lights when the last user goes to bed) and can implement the automated behavior, e.g., by establishing an automation rule that reflects the detected aggregate pattern.

To provide context for understanding the present invention, example implementations of an automated environment and a system that can determine a user's established routine and detect patterns of accessory interaction will be described. Thereafter, specific examples of providing feedback based on a detected pattern will be described.

I. Example Environment

Figure 1:
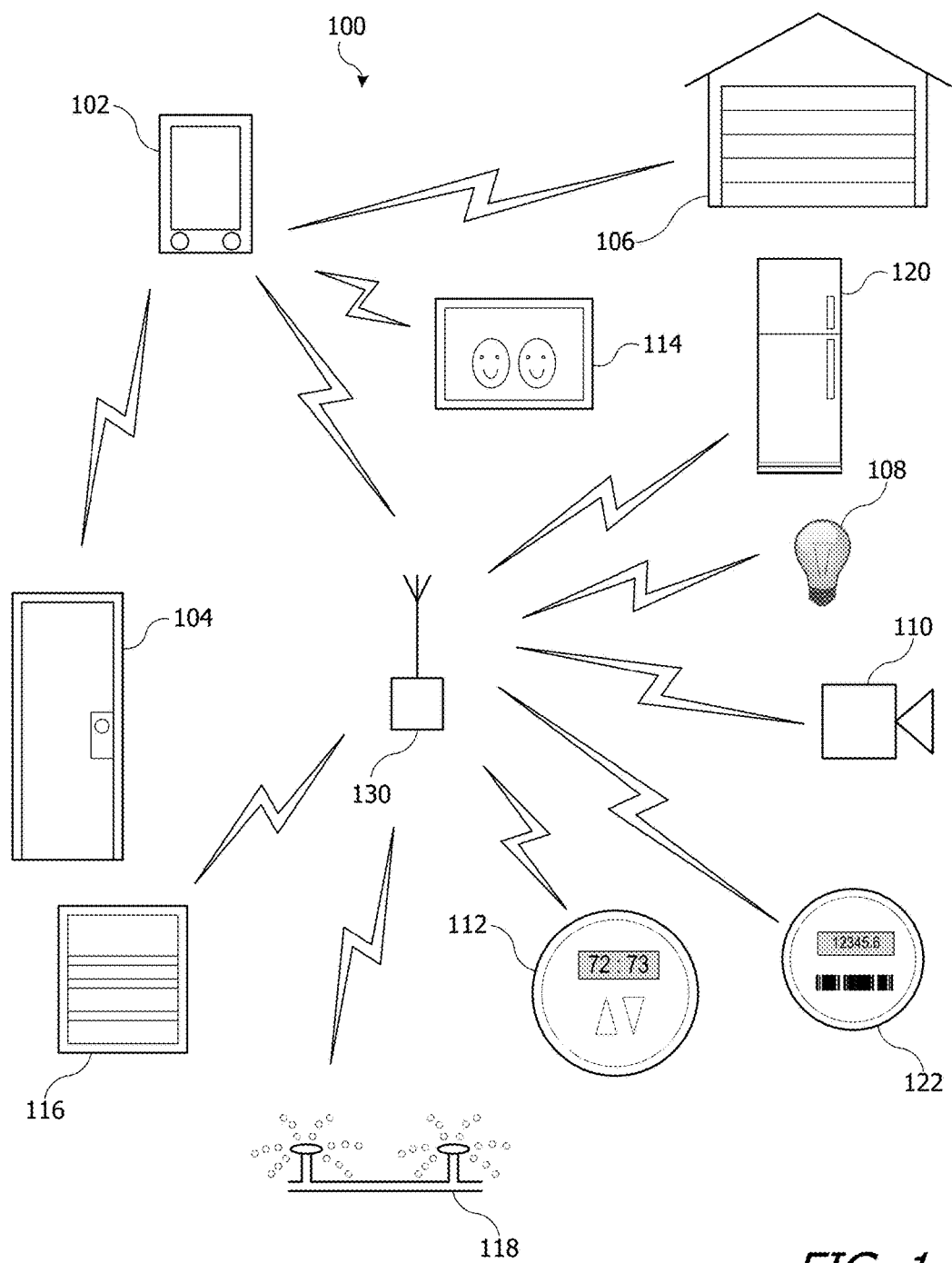
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. patent application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in home environment 100, and one or more mobile remote-control stations (e.g., a handheld or wearable device such as a mobile phone, tablet computer, smart watch, eyeglasses, etc.) can provide a user interface and communicate with the base station to effect control over accessories. In some embodiments, the base station can function as a coordinator or proxy for the accessories, e.g., as described below.

As used herein, an "accessory" can be any device or thing located in an environment that is controllable (at least to some degree) by a controller such as controller 102. Examples of accessory devices in a home environment can include door lock 104, garage door system 106, light fixture 108, security camera 110, thermostat 112, TV 114, window 116, sprinkler system 118, household appliance (e.g., refrigerator) 120, and utility meter (e.g., electric meter) 122. In some instances, controller 102 can communicate directly with an accessory; for instance, controller 102 is shown communicating directly with door lock 104, garage door system 106, and TV 114. In other instances, controller 102 can communicate via an intermediary. For instance, controller 102 is shown communicating via a wireless network access point 130 with accessories 108, 110, 112, 116, 118, 120, 122 that are on a wireless network provided by access point 130. As noted above, in some embodiments, controller 102 can include a base station, and base station functionality can be integrated into access point 130 or into one of the accessories that is to be controlled (e.g., thermostat 112). In some embodiments, a base station can function as a proxy or coordinator as described below.

Various communication transports and combinations of transports can be used, and different transports can be used with different devices. For example, some wireless transports such as Bluetooth® transports (e.g., Bluetooth Classic, Bluetooth LE, and other transports conforming to standards promulgated by Bluetooth SIG, Inc., headquartered in Kirkland, Wash.) can support direct point-to-point communication between devices within a limited range. Other wireless transports such as Wi-Fi® transports (conforming to standards promulgated by Wi-Fi Alliance, headquartered in Austin, Tex.) can define a wireless network with a central access point that routes communications between different devices on the network. Further, while wireless communication transports are shown, wired transports can also be provided for some or all of the accessories. For example, light fixture 108 can be connected to access point 130 by a wired connection, and controller 102 can communicate with light fixture 108 by sending messages wirelessly to access point 130, which can deliver the messages to light fixture 108 via the wired connection. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-122. Different controller devices can be configured to communicate with different subsets of the accessories; for example, a child's controller might be blocked from modifying settings on thermostat 112, while a parent's controller device is permitted to modify the settings. Such permissions can be configured and controlled, for example, as described in above-referenced U.S. patent application Ser. Nos. 14/725,891 and 14/725,912.

In some embodiments, a universal accessory protocol can facilitate communication by a controller 102 with one or more accessories 104-122. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. Examples of an accessory model based on services and characteristics are described in above-referenced U.S. patent application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages, and the message format can be the same across different accessories. Examples of message formats are described in above-referenced U.S. patent application Ser. No. 14/614,914.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. patent application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other (e.g., in a secure storage element), so that an established pairing can be persistent. After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a secure session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. patent application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be "universal," meaning that they can be applied in any context with one or more controllers and one or more accessories regardless of accessory function or controller form factor or specific interfaces.

II. Example Accessory and Controller Network

For purposes of implementing an automated environment, it is desirable to allow accessories to be controlled by multiple controllers and to allow one controller to control multiple accessories. Accordingly, accessories and/or controllers can be connected into accessory networks and controller networks. This can be done, for instance, by establishing pairings between various accessories and various controllers and providing a security protocol such that an accessory only responds to a controller if a pairing has been established. Examples of establishing pairings and associated security protocols are described in above-referenced U.S. patent application Ser. Nos. 14/614,914; 14/725,891; and 14/725,912.

Figure 2:
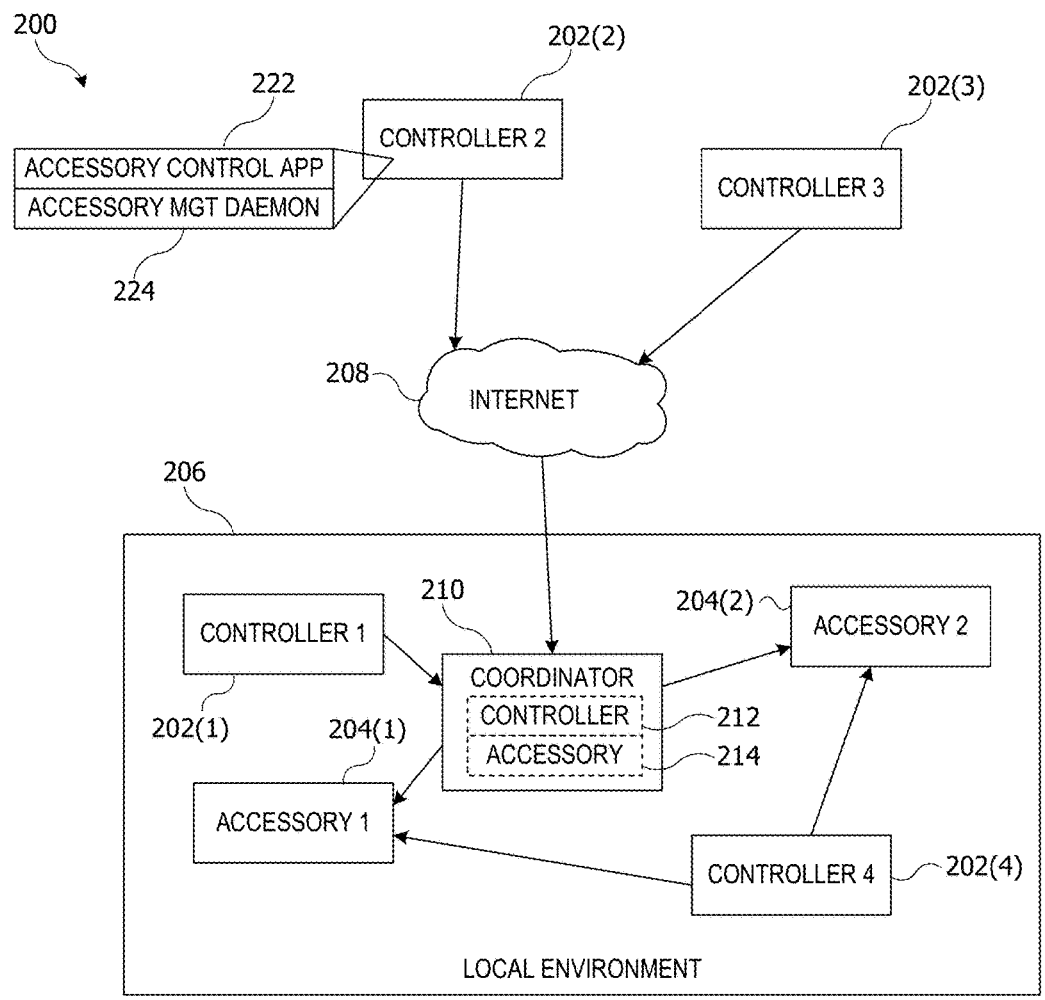
FIG. 2 shows an example of a network configuration according to an embodiment of the present invention.

In some embodiments, an automated environment can include a "coordinator" device that can act as an intermediary or proxy between controllers and accessories. FIG. 2 shows an example of a network configuration 200 according to an embodiment of the present invention that allows multiple controllers 202 to interact with multiple accessories 204 in a local environment 206. While two accessories and four controllers are shown, it is to be understood that any number of controllers and/or accessories can be included.

Controllers 202(1)-202(4) can each be similar to controller 102 of FIG. 1. For example, each controller 202 can be a mobile device (e.g., a mobile phone or wearable device). Accessories 204(1) and 204(2) can be similar to any of accessories 104-122 of FIG. 1 and can be any devices located in a "local environment" 206 (e.g., a home environment). For purposes of description, it is assumed that accessories 204 remain in local environment 206, while controllers 202, being mobile devices, can be sometimes within and sometimes outside local environment 206.

In this example, controllers 202(1) and 202(4) are currently located in local environment 206 with accessories 204(1) and 204(2). For example, controllers 202(1), 202(4), and accessories 204(1), 204(2) can be on the same local area network (LAN), such as a Wi-Fi network or within Bluetooth communication range or the like. Controllers 202(2) and 202(3) are currently located outside local environment 206 but are connected to a wide-area communication network 208 (e.g., the Internet); such controllers are said to be "remote" from accessories 204. In this example, it is assumed that accessories 204 can communicate only within local environment 206 and are not directly connected to wide-area communication network 208. Thus, communication between controller 202(2) or 202(3) with accessories 204 would proceed through an indirect path.

A "coordinator" 210 (also referred to as a coordinator device) can be a device that facilitates communication between remote controllers 202(2), 202(3) and accessories 304(1) and 304(2). Coordinator 210 can have a communication interface for communicating with the controllers and the accessories. The communication interface can comprise multiple interfaces for communicating with respective devices or be a single interface for communicating with multiple devices. A network communication interface can communicate with a server, which can communicate with coordinator devices from various automated environments. An accessory communication interface can communicate with the accessories of the automated environment. A controller communication interface can communicate with the controllers of the automated environment.

Coordinator 210 can be any electronic device that is present in local environment 206 and capable of communicating with accessories 204. For example, coordinator 210 can be a mobile device that happens to be in local environment 206. As another example, coordinator 210 can be a device that is expected to stay in local environment 206 and that is expected to be powered on and available for communication most or all of the time. (It is to be understood that coordinator 210 can occasionally be unavailable, e.g., in connection with software or firmware upgrades, power outages, or other intermittent occurrences.) For example, coordinator 210 can be implemented in a desktop computer, a network access-point unit, a dedicated accessory-control base station, a set-top box for a television or other appliance (which can implement coordinator and/or other base station functionality in addition to interacting with the television or other appliance), or any other electronic device as desired.

In some embodiments, coordinator 210 can act as a relay or proxy between controllers 202 and accessories 204. Thus, for example, coordinator 210 can present itself to controllers 202 as a virtual accessory 214 and to accessories 204 as a virtual controller 212. In operation, a controller, e.g., controller 202(2), can establish a secure communication session with coordinator 210 and send a message to coordinator 210 indicating that it wishes to communicate with an accessory in local environment 206, e.g., accessory 204(1). Coordinator 210 can establish a secure communication session with accessory 204(1) and use that session to relay messages between controller 202(2) and accessory 204(1). For example, through the relay, controller 202(2) can establish its own secure session with accessory 204(1), then send control messages and receive responses within the secure session. In some embodiments, coordinator 210 can pass the messages back and forth (optionally adding its own authenticated signature or encryption layer) while remaining agnostic to their content. Examples of such operations are described in above-referenced U.S. patent application Ser. Nos. 14/725,891 and 14/725,912.

In some embodiments, controllers 202 can prefer to communicate with accessories 204 via coordinator 210 whenever coordinator 210 is available. Thus, for example, controller 202(1), which is in local environment 206, can communicate with coordinator 210 rather than directly with accessories 204. Remotely located controllers 202(2) and 202(3) do not have direct communication with accessories 204 and also communicate via coordinator 210. Alternatively, controllers 202 can communicate directly with accessories 204 when in local environment 206, e.g., as shown for controller 202(4). Any combination of direct and/or indirect communication with accessories can be supported.

Where a controller-coordinator pairing and one or more coordinator-accessory pairings are established, coordinator 210 can present itself to controllers 202 as an "accessory network" via which controller 202 can access all the services of all accessories 204 with which coordinator 210 has an established pairing. For instance, coordinator 210 can present an accessory network modeled as a "home" or other environment. The model can define various physical and/or logical groupings of accessories that can be controlled in a coordinated manner. Controllers 202 can operate any accessory in the network by interacting with coordinator 210. In some instances, operation of particular accessories by particular controllers can be restricted using a system of permissions.

In some embodiments, coordinator 210 can operate as an intelligent agent for allowing controllers 202 to operate accessories 204, rather than simply relaying messages as described above. For example, when controller 202(1) receives a user request to interact with accessory 204(1), controller 202(1) can provide instructions for accessory 204(1) to coordinator 210. Coordinator 210 can receive the instructions, establish a communication session with accessory 204(1) and send appropriate control messages to accessory 204(1). In some embodiments, the messages sent to accessory 204(1) need not correspond to the instructions provided by controller 202(1). For example, while communicating with controller 202(1), coordinator 210 may also be in communication with another controller (e.g., controller 202(2)). Controllers 202(1) and 202(2) may each provide instructions for accessory 204(1) to coordinator 210. Coordinator 210 can analyze the received instructions, e.g., to detect and resolve conflicts such as where controller 202(1) instructs coordinator 210 to turn accessory 204(1) on while controller 202(2) instructs coordinator 210 to turn accessory 204(1) off Coordinator 210 can be programmed with priority rules or other rules for resolving conflicts (e.g., "on" takes priority over "off"; instructions from controller 202(1) take priority over instructions from controller 202(2); etc.). Coordinator 210 can apply the priority rule to resolve any conflicts and can communicate instructions to accessory 204(1) based on the resolution. When a response is received from accessory 204(1), coordinator 210 can determine whether to send a corresponding message (or a different message) to controller 202(1) and/or to controller 202(2). Thus, coordinator 210 is not limited to acting as a passive relay for messages between controllers and accessories but can actively intervene to resolve conflicting instructions, enforce any limitations that may exist on the privileges or permissions granted to particular controllers or users, and so on. Further examples of operation of a coordinator such as coordinator 210 are described in above-referenced U.S. patent application Ser. Nos. 14/725,891 and 14/725,912.

From a user's perspective, operation of controller 202(2) to control accessories 204 can be the same regardless of whether the connection to accessories 204 is direct or through coordinator 210. For example, as shown for controller 202(2), any of controllers 202 can execute an accessory-control application 222 that generates a user interface (such as a graphical user interface) for controlling any of accessories 204, e.g., accessory 204(1). The interface can include display elements to display current settings of accessory 204, user-operable controls to change some or all of the settings, etc. Accessory-control application 222 can interact with an operating-system process 224 (referred to herein as an "accessory management daemon") that manages the communication between controller 202(2) and accessory 204(1). Accessory management daemon 224 can present an application program interface (API) to application 222 in a manner that is transport-agnostic, so that application 222 can, for instance, invoke an API function indicating that a message should be sent to accessory 204(1). Accessory management daemon 224 can, transparently to the user, create either a direct or indirect (e.g., through coordinator 210) communication path to accessory 204(1) and send the message. In some embodiments, accessory management daemon 224 can also handle operations such as pair verify and encryption/decryption of communications within a pair-verified session, transparently to application 222.

Network configuration 200 can support automated operation of accessories 204. For example, any of controllers 202 or coordinator 210 can execute program code that sends control messages to one or more of accessories 204 upon the occurrence of certain triggering conditions, such as a particular time of day or a particular user action (e.g., user leaving the house). The control messages can instruct the accessory to initiate an action, also called an accessory action. Thus, for example, a thermostat accessory (e.g., accessory 112 of FIG. 1) can be instructed to heat (or cool) the house to a desired temperature at a particular time based on the user's expected arrival, or to turn off the heat (or cooling) when the user leaves. A user leaving (or entering) local environment 206 can be detected using various techniques. For example, controller 202(1) (or any other controller 202) can be a mobile device that the user habitually wears or carries wherever he or she goes and that automatically connects to a wireless local area network (e.g., a home-based Wi-Fi network) when it is within signal range of the network. When controller 202(1) disconnects from the network (and remains disconnected for a minimum time), coordinator 210 (or another device that is resident in local environment 206) can detect the disconnection and infer that the user has left local environment 206. Similarly, when controller 202(1) subsequently reconnects, coordinator 210 can infer that the user has returned to local environment 206. Any other information available to coordinator 210 can be used, including input from presence or proximity sensors that may be installed in local environment 206, location data provided by the user's controller 202(1), inferences from user interactions with particular accessories, and so on.

It will be appreciated that network configuration 200 is illustrative and that variations and modifications are possible. Any number of controllers can establish pairings with an accessory, and each controller can be any type of electronic device that supports user interaction (e.g., through a local or remote user interface) and that can communicate with other devices via wired and/or wireless channels. Examples include mobile phones, tablets, wearable devices, laptop computers, desktop computers, dedicated accessory-control base stations, and so on. The accessory can be any electronic device that has a controllable function and that is capable of communicating with other devices via wired and/or wireless interfaces. Examples include lamps (or lights), fans, thermostats, appliances (refrigerator, oven, dishwasher, clothes washer, clothes dryer, vacuum cleaner, etc.), door locks, door openers, media storage and/or playback devices (TV, cable or satellite television interface unit, DVD player, digital video recorder, digital music player, streaming media device, etc.), utility meters (e.g., water, electric, and/or gas meters that can be read by a controller), irrigation systems (e.g., sprinklers, drip irrigation), and so on.

III. Example Devices

Figure 3:
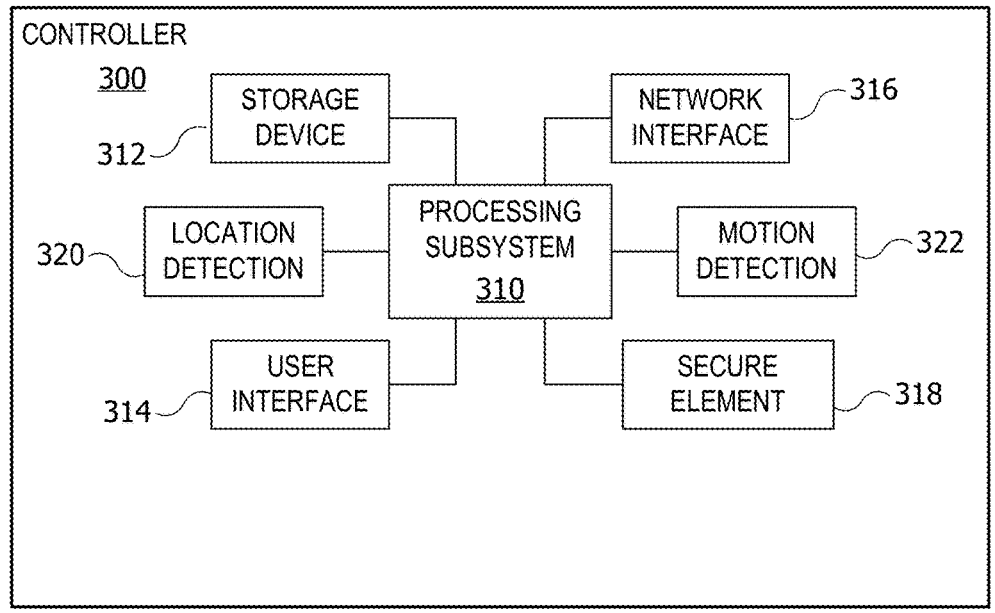
FIG. 3 is a simplified block diagram of a controller according to an embodiment of the present invention.

FIG. 3 is a simplified block diagram of a controller 300 according to an embodiment of the present invention. Controller 300 can implement any or all of the controller functions, behaviors, and capabilities described herein, as well as other functions, behaviors, and capabilities not expressly described. Controller 300 can include processing subsystem 310, storage device 312, user interface 314, network interface 316, secure element 318, location detection element 320, and motion detection element 322. Controller 300 can also include other components (not explicitly shown) such as a battery, power controllers, and other components operable to provide various enhanced capabilities. In various embodiments, controller 300 can be implemented in a desktop computer, laptop computer, tablet computer, smart phone, wearable computing device, or other systems having any desired form factor. Further, as noted above, controller 300 can be implemented partly in a base station and partly in a mobile unit that communicates with the base station and provides a user interface.

Storage device 312 can be implemented, e.g., using disk, flash memory, or any other non-transitory storage medium, or a combination of media, and can include volatile and/or non-volatile media. In some embodiments, storage device 312 can store one or more application and/or operating system programs to be executed by processing subsystem 310, including programs to implement various operations described herein as being performed by a controller. For example, storage device 312 can store a universal controller application that can read an accessory description record and generate a graphical user interface for controlling the accessory based on information therein (as described in above-referenced U.S. patent application Ser. No. 14/614,914).

Storage device 312 can also store a "user routine" program that can determine a user routine and detect deviations from that routine (e.g., as described below). In some embodiments, portions (or all) of the controller functionality described herein can be implemented in operating system programs rather than applications. In some embodiments, storage device 312 can also store apps designed for specific accessories or specific categories of accessories (e.g., an IP camera app to manage an IP camera accessory or a security app to interact with door lock accessories).

User interface 314 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 314 to invoke the functionality of controller 300 and can view and/or hear output from controller 300 via output devices of user interface 314.

Processing subsystem 310 can be implemented as one or more integrated circuits, e.g., one or more single-core or multi-core microprocessors or microcontrollers, examples of which are known in the art. In operation, processing subsystem 310 can control the operation of controller 300. In various embodiments, processing subsystem 310 can execute a variety of programs in response to program code and can maintain multiple concurrently executing programs or processes. At any given time, some or all of the program code to be executed can be resident in processing subsystem 310 and/or in storage media such as storage device 312.

Through suitable programming, processing subsystem 310 can provide various functionality for controller 300. For example, in some embodiments, processing subsystem 310 can implement various processes (or portions thereof) described herein as being implemented by a controller. Processing subsystem 310 can also execute other programs to control other functions of controller 300, including application programs that may be stored in storage device 312. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Network interface 316 can provide voice and/or data communication capability for controller 300. In some embodiments, network interface 316 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments, network interface 316 can provide wired network connectivity (e.g., Ethernet) in addition to or instead of a wireless interface. Network interface 316 can be implemented using a combination of hardware (e.g., driver circuits, antennas, modulators/demodulators, encoders/decoders, and other analog and/or digital signal processing circuits) and software components. In some embodiments, network interface 316 can support multiple communication channels concurrently, using the same transport or different transports.

Secure element 318 can be an integrated circuit or the like that implements or supports cryptographic operations of controller 300, including any or all cryptographic operations related to pair setup, pair add, and pair verify. Secure element 318 can appear as a "black box" to the rest of controller 300. Thus, for instance, network interface 316 can receive a message in encrypted form that it cannot decrypt and can simply deliver the message to processing subsystem 310. Processing subsystem 310 may also be unable to decrypt the message, but it can recognize the message as encrypted and deliver it to secure element 318. Secure element 318 can decrypt the message and determine what information to return to processing subsystem 310. As a result, certain information can be available only within secure element 318. If secure element 318 is a single IC that executes code only from its own secure repository, this can make extraction of the information extremely difficult, which can provide a high degree of security. Examples of secure elements are described further in above-referenced U.S. patent application Ser. Nos. 14/725,891 and 14/725,912.

Location detection element 320 can include hardware and/or software components operable to determine a geographical location of controller 300. For example, location detection element 320 can implement a GPS receiver. Other location-determination technologies can also be used, such as Wi-Fi fingerprinting (distinguishing and recognizing locations based on availability and signal strength of various Wi-Fi networks), cellular tower triangulation (based on detecting proximity to different transceiver "cells" in a cellular voice or data network), and so on.

Motion detection element 322 can include hardware and/or software components operable to detect and measure motion of controller 300. For example, motion detection element 322 can include motion sensors such as accelerometers, gyroscopic motion sensors, or the like. In some embodiments, motion detection element 322 can process signals from the motion sensors and infer a specific activity or motion of the controller or a user (e.g., whether the user is riding in a vehicle, walking, running, etc.). In some embodiments, controller 300 can also incorporate other types of environmental sensors, such as ambient light sensors, ambient sound sensors, physiological sensors, etc.

Figure 4:
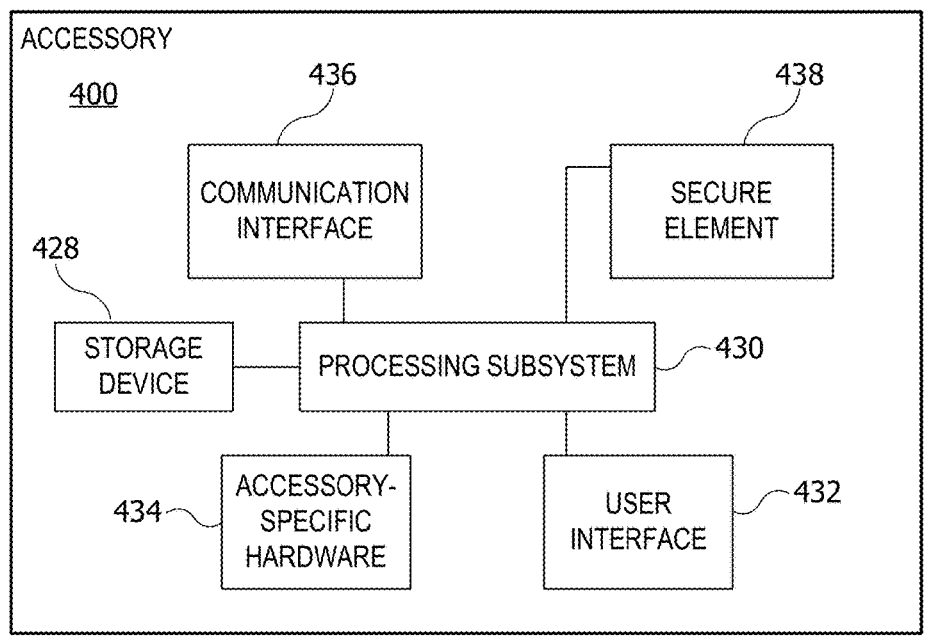
FIG. 4 is a simplified block diagram of an accessory according to an embodiment of the present invention.

FIG. 4 is a simplified block diagram of an accessory 400 according to an embodiment of the present invention. Accessory 400 can implement any or all of the accessory functions, behaviors, and capabilities described herein, as well as other functions, behaviors, and capabilities not expressly described. Accessory 400 can include storage device 428, processing subsystem 430, user interface 432, accessory-specific hardware 434, communication interface 436, and secure element 438. Accessory 400 can also include other components (not explicitly shown) such as a battery, power controllers, and other components operable to provide various enhanced capabilities. Accessory 400 is representative of a broad class of accessories that can be operated by a controller such as controller 300, and such accessories can vary widely in capability, complexity, and form factor. For instance, accessory 400 can implement any of accessories 104-122 of FIG. 1.

Storage device 428 can be implemented, e.g., using disk, flash memory, or any other non-transitory storage medium, or a combination of media, and can include volatile and/or non-volatile media. In some embodiments, storage device 428 can store one or more application programs to be executed by processing subsystem 430, including programs to implement various operations described above as being performed by an accessory, as well as operations related to particular accessory behaviors. Storage device 428 can also store an accessory descriptor record that can be furnished to controller devices, e.g., during device discovery as described in above-referenced U.S. patent application Ser. No. 14/614,914. Storage device 428 can also store accessory state information and any other data that may be used during operation of accessory 400.

Processing subsystem 430 can include, e.g., one or more single-core or multi-core microprocessors and/or microcontrollers executing program code to perform various functions associated with accessory 400. For example, processing subsystem 430 can implement various processes (or portions thereof) described above as being implemented by an accessory, e.g., by executing program code stored in storage device 428. Processing subsystem 430 can also execute other programs to control other functions of accessory 400. In some instances programs executed by processing subsystem 430 can interact with a controller (e.g., controller 300), e.g., by generating messages to be sent to the controller and/or receiving messages from the controller.

User interface 432 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 400, a user can operate input devices of user interface 432 to invoke functionality of accessory 400. Some accessories may provide a minimal or no user interface.

Accessory-specific hardware 434 can include any other components that may be present in accessory 400 to enable its functionality. For example, in various embodiments, accessory-specific hardware 434 can include one or more storage devices using fixed or removable storage media; GPS receiver; power supply and/or power management circuitry; a camera; a microphone; one or more actuators; control switches; fans; motors; heating elements; valves; position sensors (e.g., position encoders); environmental sensors (e.g., temperature sensor, pressure sensor, accelerometer, chemical sensor, etc.); and so on. It is to be understood that any type of accessory functionality can be supported by providing appropriate accessory-specific hardware 434 and that accessory-specific hardware can include mechanical as well as electrical or electronic components.

Communication interface 436 can provide voice and/or data communication capability for accessory 400. In some embodiments, communication interface 436 can include radio frequency (RF) transceiver components for accessing wireless voice and/or data networks (e.g., using cellular telephone technology, data network technology such as 3G, 4G/LTE, Wi-Fi (IEEE 802.11 family standards), or other mobile communication technologies, or any combination thereof), components for short-range wireless communication (e.g., using Bluetooth and/or Bluetooth LE standards, NFC, etc.), and/or other components. In some embodiments, communication interface 436 can provide wired network connectivity (e.g., Ethernet) in addition to or instead of a wireless interface. Communication interface 436 can be implemented using a combination of hardware (e.g., driver circuits, antennas, modulators/demodulators, encoders/decoders, and other analog and/or digital signal processing circuits) and software components. In some embodiments, communication interface 436 can support multiple communication channels concurrently, using the same transport or different transports.

Secure element 438 can be an integrated circuit or the like that implements or supports cryptographic operations of accessory, including any or all cryptographic operations related to pair setup, pair add, or pair verify. Secure element 438 can operate similarly to secure element 318 in controller 300. Examples of secure elements are described further in above-referenced U.S. patent application Ser. Nos. 14/725,891 and 14/725,912.

Accessory 400 can be any electronic apparatus that interacts with controller 300. In some embodiments, controller 300 can provide control over operations of accessory 400 as described above. For example, controller 300 can provide a user interface for accessory 400 that can include both input and output controls (e.g., a display screen to display current state information obtained from accessory 400 and an input control such as a touchscreen overlay to allow the user to initiate changes to the state information, resulting in a change in some attribute of the accessory's state). In various embodiments, controller 300 can control any function of accessory 400 and can also receive data from accessory 400. Further, in some instances, accessory 400 can operate as a coordinator for other accessories, e.g., as described above.

It will be appreciated that the system configurations and components described herein are illustrative and that variations and modifications are possible. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. For example, as noted above, coordinator 210 of FIG. 2 can implement both accessory and controller functionality, and the same hardware components can be used for both. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

IV. Example of Determining a User Routine

As noted above, it may be desirable for a controller (or coordinator) to automate operation of an accessory for the convenience of occupants of an environment where the accessory is located. For example, referring to FIG. 1, it may be desirable to operate thermostat 112 to warm (or cool) home environment 100 to a desired temperature in anticipation of the occupant returning. Or it may be desirable to make sure that TV 114 and light fixture 108 are both switched off when the occupant goes to bed.

While desirable, such automated control is complicated by the reality that most human beings do not adhere to a rigid schedule. Further, many environments have multiple occupants; for instance, a home may be occupied by parents and children, by a group of unrelated housemates, or the like. (The term "family" may be used herein to refer collectively to the occupants of a home, regardless of their particular legal or biological relationship or lack thereof.)

Accordingly, home automation and control can be enhanced based on knowledge of a user routine of various occupants. As used herein, a "user routine" (or just "routine") can refer generally to any pattern of behavior of an individual that can be inferred by an automated machine learning algorithm based on inputs indicative of the individual's location and/or activity at various times over an extended time span. Thus, a pattern of individual user behavior can be used. In some embodiments, a user routine can be inferred by a mobile device that an individual habitually wears or carries (e.g., a smart phone or smart watch or the like), based on data automatically collected by the device.

Figure 5:
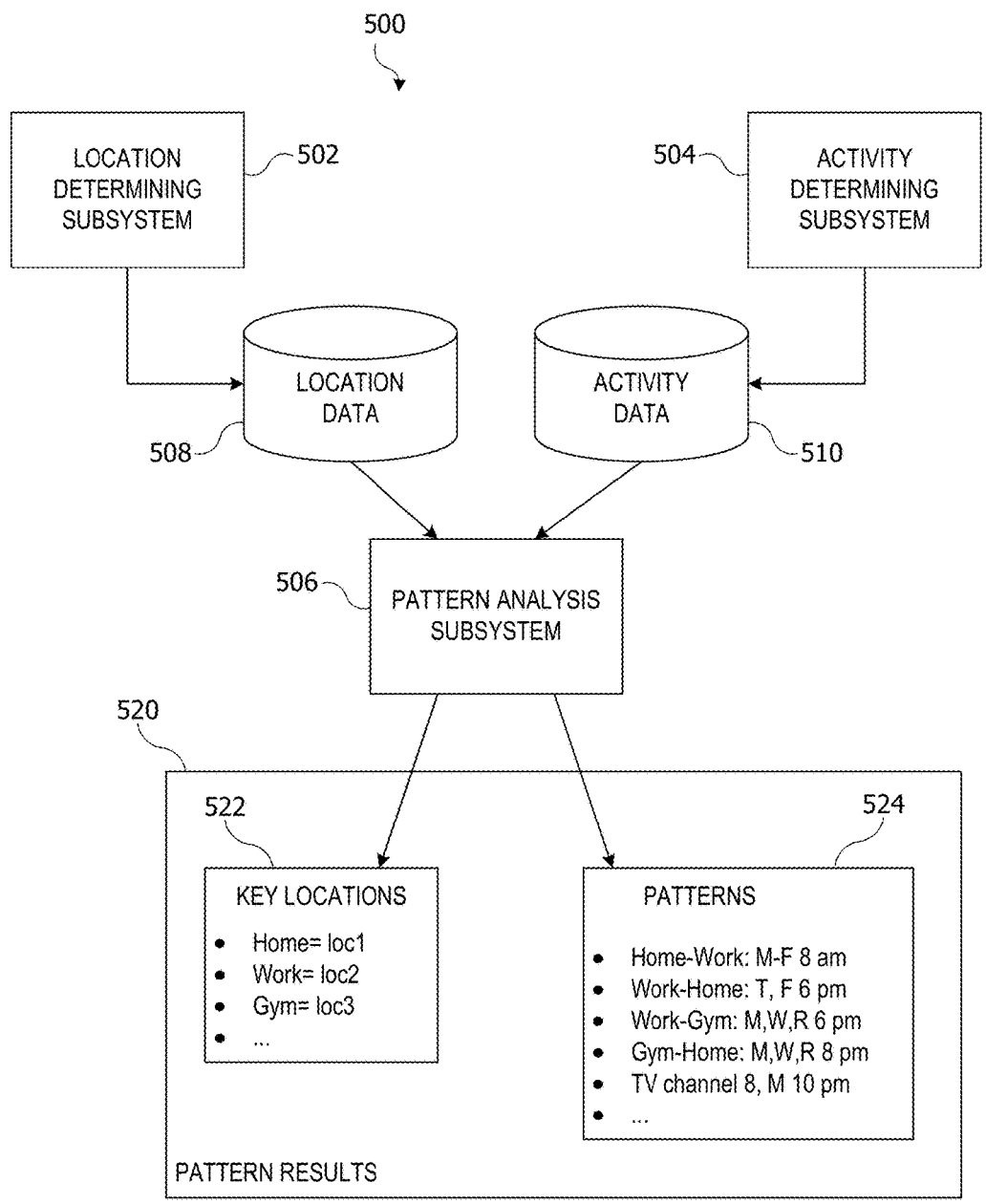
FIG. 5 is a simplified block diagram of a system for determining a user routine that can be used in connection with an embodiment of the present invention.

FIG. 5 is a simplified block diagram of a system 500 for inferring a user routine that can be used in connection with an embodiment of the present invention. System 500 can be implemented in a mobile device such as a smart phone or smart watch, and the same device can also implement a controller as described herein (e.g., controller 300 of FIG. 3, any of controllers 202 of FIG. 2, controller 102 of FIG. 1). System 500 can gather and analyze data pertaining to user location and activity across time and can analyze the data to detect patterns.

System 500 can include a location determining subsystem 502, an activity determining subsystem 504, and a pattern analysis subsystem 506. Location determining subsystem 502 can operate at various times to determine the current location of the device in which system 500 is implemented and can store the location information in location data store 508. For example, location determining subsystem 502 can incorporate a GPS receiver and can activate the GPS receiver from time to time to obtain a location fix (e.g., standard world coordinates representing the location of the device). The location fix, along with a time stamp indicating when the fix was obtained, can be stored in location data store 508. Location determining subsystem 502 can operate on a fixed schedule (e.g., recording location every few minutes) or opportunistically (e.g., recording location data whenever another process in the device requests current location information).

Activity determining subsystem 504 can operate at various times to determine a current activity in which the user is engaged and can store the activity information in activity data store 510. For example, activity determining subsystem 504 can incorporate accelerometers, gyroscopic motion sensors, or other inertial motion sensors that can detect whether and how the device is moving. In some embodiments, activity determining subsystem 504 can determine the user activity based on the motion (e.g., whether the user is running, walking, riding in a vehicle, stationary, or whether the device is at rest on a stable surface such as a tabletop). Like location determining subsystem 502, activity determining subsystem 504 can operate on a regular schedule or opportunistically as desired. In some embodiments, activity determining subsystem 504 can also detect other status information pertaining to the device, such as whether the device is connected to a power source (e.g., a charger) or to a particular auxiliary device (e.g., an automobile head unit, a speaker dock, a specific computer system). This status information can also include information pertaining to user interactions with the device, such as launching a particular app (e.g., workout tracking app, telephony app, media app, remote control app to control accessories as described above) or changing device settings (e.g., enabling or disabling a "do not disturb" function, setting or canceling an alarm, etc.). In some embodiments, the status information can also include elements of the user's personal data that are accessible to the device in which system 500 is implemented, such as calendar data (e.g., scheduled appointments, meetings, and other events) maintained for the user. In general, any information indicative of what a user is doing that can be detected by the device can be included as activity data. Time-stamped activity data can be recorded in activity data store 510.

Through the ongoing operation of location determining subsystem 502 and activity determining subsystem 504, location data store 508 and activity data store 510 can accumulate a collection of location and activity records covering a span of time (e.g., six to eight weeks). The particular time span can be selected as desired, based on considerations such as storage space, the length of a time span needed to detect patterns of activity, and the desire to protect user privacy by not keeping records of user activity indefinitely, while keeping enough data to provide useful pattern results.

Pattern analysis subsystem 506 can periodically (e.g., once a day or once a week or the like) analyze the data accumulated in location data store 508 and activity data store 510 to detect various patterns that may be present. Examples of patterns can include going to particular locations repeatedly, going to a particular location at a similar time each day (e.g., commuting to and from work), using a particular device function while in a particular location (e.g., launching a workout app when at the gym), using a particular device function at a consistent time or in a consistent manner (e.g., setting alarm for 7:00 am, turning off the lights between 10 pm and 11 pm), or the like. Examples of pattern analysis and pattern detection are described in above-referenced U.S. patent application Ser. No. 14/081,895.

Pattern analysis subsystem 506 can output various pattern results 520. For example, pattern results 520 can include a set of "key location" identifiers 522. As used herein, a "key location" can be a location that the user visits regularly and spends significant time at. Examples can include the user's home, the user's place of work, a gym (or other workout space) the user frequents, and so on. In some embodiments, pattern analysis subsystem 506 can generate a list of key locations 522 without semantically labeling them. In other embodiments, pattern analysis subsystem 506 can assign semantic labels to some or all of key locations 522, e.g., based on activity information correlated with the location. For instance, a "home" location can be identified based on activity patterns such as where the device is when it is charged, where the device is left resting on a surface for long periods of time (suggesting that the user is asleep), where the device is when a daily alarm goes off, etc. A "work" location can be identified based on where the user goes most regularly that is not the home location and/or on activity the user does there (e.g., accessing productivity apps). Other locations, such as a gym, store, or the like can also be identified based on activity information (e.g., a "gym" can be any place where a user regularly performs workout activities such as running, cycling, or weightlifting).

Another example of pattern results can be pattern identifiers 524. Pattern identifiers 524 can include transitions between key locations that occur with reasonable regularity, such as the user going from home to work (or vice versa) or from work to the gym (if the user regularly goes to a gym after work). In some embodiments, pattern identifiers 524 can also include patterns of interactions with accessories in a particular location, provided that the device in which system 500 is included can detect the interaction. For instance, upon coming home, the user may operate a remote control app on his or her mobile phone to turn on the TV or select a particular program to watch, and such interactions can be detected and recorded by activity determining subsystem 504.

In some embodiments, pattern results are periodically generated or updated (e.g., on a daily or weekly basis), and previous results can be used to inform the generation of new pattern results. In such cases, it may be useful to retain "old" pattern results for a period of time. This period of time can be limited (e.g., to four months, eight months, etc.), in the interest of protecting user privacy.

It will be appreciated that system 500 is illustrative and that variations and modifications are possible. Determination of a user routine can be implemented in any manner desired, and further examples can be found in above-referenced U.S. patent application Ser. No. 14/081,895. In the interest of protecting user privacy, it may be desirable for system 500 to be implemented entirely within a single device (e.g., the user's mobile phone), such that the location data, activity data, and/or pattern results are not shared with other devices. In addition, it may be desirable to discard location data, activity data, and/or pattern results after a period of time (e.g., several weeks). In some embodiments, some or all of pattern results 520 (including key location identifiers 522 and/or pattern identifiers 524) can be selectively made available to trusted applications on the device in which system 500 is implemented and/or to other trusted devices, e.g., as described below; the raw location data and/or activity data from which pattern results were derived need not be shared.

V. Example of Determining Aggregated Routines

In some embodiments of the present invention, an automated environment can aggregate established user routines across controllers belonging to multiple users who frequent the automated environment. The aggregated routine can provide information that can aid in controlling the automated environment.

Figure 6:
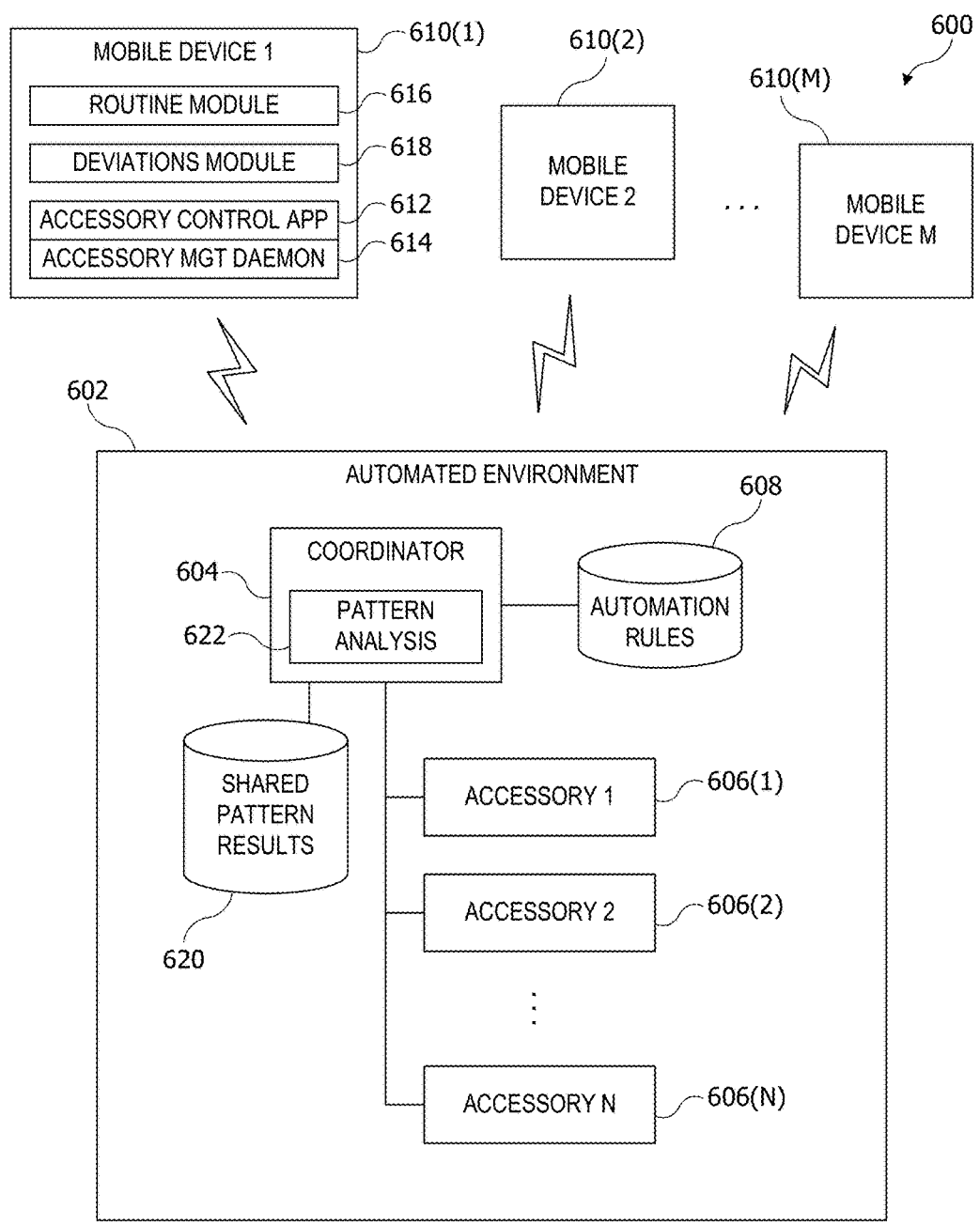
FIG. 6 is a simplified block diagram of a system according to an embodiment of the present invention.

FIG. 6 is a simplified block diagram of a system 600 according to an embodiment of the present invention. System 600 can include an automated environment 602. Automated environment 602 can include a coordinator 604, which can be similar to coordinator 210 of FIG. 2, and various accessories 606(1)-606(N) with which coordinator 604 can communicate. (N can be any integer.) As described above, accessories 606 can include various objects or things in an environment that can be electronically controlled, such as any of accessories 104-122 of FIG. 1. Accessories 606 can operate similarly to accessories 204 of FIG. 2.

In this example, coordinator 604 can maintain a store of automation rules 608. As used herein, an automation rule can specify an action to be taken by one or more of accessories 606 and a triggering condition under which the action is to be taken. The action can be any action that can be performed by a specific accessory 606, and the rule can specify which accessory (or accessories) 606 is to act. The triggering condition can be any condition that is detectable by coordinator 604 or by any of accessories 606. For example, an automation rule can specify that a porch light (an accessory) is to be turned on if an outside ambient light sensor (which can be a separate accessory or a component of the porch light accessory) detects a light level below a threshold, or at a specific time each night (e.g., 6:30 pm), or at a time determined based on information available to coordinator 604 (e.g., sunset, where coordinator 604 can determine the time of sunset by accessing weather data via the Internet or the like). As another example, an action can include turning on a heating (or cooling) system to adjust the temperature of the house to a target temperature, or changing the target temperature for the heating (or cooling) system. The triggering condition for a temperature change can be, for example, a specific time (e.g., shortly before the time the user normally arrives at home) or a specific event (e.g., when the user actually arrives home). Additional examples are described below. As another example, the triggering condition can be based on a specific subset of the users being present in the automated environment. The coordinator device can determine which of the users are currently in the automated environment based on signals from the plurality of mobile devices.

Automation rules 608 can be established in any manner desired. For example, a user can establish an automation rule by direct input (e.g., entering explicit instructions specifying a triggering condition and the action to be taken in response to that condition). In some embodiments, coordinator 604 or other components of system 600 can learn the users' behavior and define suggested automation rules, including rules based on aggregate patterns as described below. Coordinator 604 or other components of system 600 can present a suggested automation rule to the user, and the user can accept or decline the suggestion. Other techniques for establishing automation rules 608 can also be used.

In the example shown, coordinator 604 maintains all automation rules 608; however, other implementations are possible. For instance, an accessory 606 can maintain its own automation rule(s), provided that the accessory is capable of detecting the triggering condition and initiating the corresponding action.

A number of mobile devices 610(1)-610(M) can communicate with automated environment 602. (M can be any integer.) Each mobile device 610 can be, for example, a mobile phone, wearable device, or other electronic device that a user may habitually wear or carry while going about daily activities. Some or all of mobile devices 610 can be a controller for accessories 606. For example, as shown for mobile device 610(1), a mobile device can implement an accessory control app 612 and an accessory management daemon 614, which can be similar or identical to elements of controller 202 described above. Thus, mobile device 610 can communicate with components of automated environment 602 regardless of whether mobile device 610 is in physical proximity to the various devices of automated environment 602.

In addition, as shown for mobile device 610(1), each mobile device 610 can include a routine module 616 (e.g., implementing system 500 described above) that can determine an established user routine (including, e.g., pattern results 520). Mobile device 610 can also include a deviations module 618, which can analyze real-time data provided by location determining subsystem 502 and/or activity determining subsystem 504 and can compare the real-time location and/or activity data to pattern results 520 to determine whether the user's current location and/or activity is consistent or inconsistent with the established user routine. As used herein, a "deviation" can refer to any instance where the user's current location and/or activity is inconsistent with an established user routine. For instance, the established user routine can be used to predict a current location and/or activity, and this prediction can be compared with the real-time data. Examples of specific logic and processes for detecting deviations from an established user routine are described in above-referenced U.S. patent application Ser. No. 14/081,895.

In operation, each of mobile devices 610 can be owned or operated by a different user who frequents automated environment 602 (e.g., the residents of a home), and the users can interact with accessories 606 using mobile devices 610. In some embodiments, routine module 616 can collect and store accessory interaction data, e.g., using activity determining subsystem 504 of FIG. 5, in addition to other types of activity data. The accessory interaction data can include, e.g., which accessory 606 the user interacted with, what (if any) accessory operations the user invoked, information about where accessory 606 is located within automated environment 602, and time of the interaction. In some embodiments, the accessory interaction data can be time-correlated with location data gathered by location determining subsystem 502 of FIG. 5, and/or other activity data. In some embodiments, accessory interaction data is gathered only while mobile device 610 is in a key location, such as within automated environment 602.

As described above with reference to FIG. 5, the routine module in each mobile controller can generate pattern results based on its collected location and/or activity data. The pattern results can indicate a routine of the user, such as when the user typically moves between key locations and/or when the user performs other regularly occurring activities such as going to bed and rising from bed.

In embodiments of the present invention, each mobile device 610 can share its user-routine information (e.g., any or all of pattern results 520 of FIG. 5) with coordinator 604, and this can allow coordinator 604 to implement decision logic based on the collective routines of the users who frequent automated environment 602. For example, in an embodiment where automated environment 602 is a home, coordinator 604 can receive pattern results from a mobile device owned by each user who lives in the home and can store the received pattern results in shared pattern results data store 620. For example, as described above, each user who lives in the home can establish a pairing of his or her mobile device 610 with coordinator 604. This pairing can be used to provide a secure session for communicating between mobile device 610 and coordinator 604, and pattern results can be communicated via the secure session, so that access to information about the user's routine can be limited to mobile device 610 and coordinator 604.

In some embodiments, the pattern results that mobile device 610 shares with coordinator 604 can be limited to pattern results that are pertinent to operation of the coordinator 604 (e.g., to the automation of environment 602). For example, if automated environment 602 is a home, the shared pattern results can be limited to those patterns that are pertinent to the home. For example, home automation typically would not be affected by details of where users go or what they do when they are away from home, and such information can be excluded from the shared pattern results. For instance, the shared pattern information can include information about when the user routinely leaves the home or when the user routinely returns to the home (e.g., as measured by at least a certain percentage of exits and entrances), while excluding any information about where the user goes upon leaving or what the user does while gone.

Similarly, shared pattern information can include information about selected activities that the user routinely performs while at home, such as the user's routine bedtime or waking time. In some embodiments, times associated with particular activities can be specified with a low resolution; for instance, instead of specifying that the user routinely leaves the house at 8:45 am, the shared pattern results can specify that the user routinely leaves between 8:00 am and 9:00 am.

It will be appreciated that system 600 is illustrative and that variations and modifications are possible. For example, coordinator 604 is shown as being physically located within automated environment 602. Where this is the case, user privacy can easily be protected, as user data (e.g., activity data, location data, and/or detected pattern data) can be stored locally on the user's mobile device 610 (the data need not be backed up to cloud-based or other remote storage systems) and/or on storage media local to coordinator 604. In some embodiments, mobile devices 610 can be configured to transmit pattern results to coordinator 604 only when they are physically present with coordinator 604 in automated environment 602, and this can also help to prevent interception of potentially sensitive data. Local storage can be further secured, e.g., using standard or advanced data encryption techniques and/or by limiting the visibility of the local storage device (e.g., data store 620 may be visible only to coordinator 604). In an alternative embodiment, part or all of the functionality of coordinator 604 can be implemented using a remote device (e.g., a cloud-based server) that communicates with environment 602 via a wide-area network such as the Internet; for instance, pattern analysis can be performed by a cloud-based server. Where this is the case, privacy safeguards (e.g., secure encryption of user data and/or aggregate pattern data) can be implemented to prevent unauthorized access to data.

Coordinator 604 can analyze the pattern data received from multiple mobile devices 610 to detect aggregate patterns across the users who frequent automated environment 602. For example, coordinator 604 can include its own pattern analysis module 622, which can implement algorithms similar to pattern analysis subsystem 506 of FIG. 5. Pattern analysis module 622 can operate on shared pattern results stored in data store 620 and can detect aggregate patterns across the users (or their controllers). As used herein, an "aggregate pattern" can include any pattern that incorporates behaviors of multiple mobile devices and/or multiple users.

Figure 7:
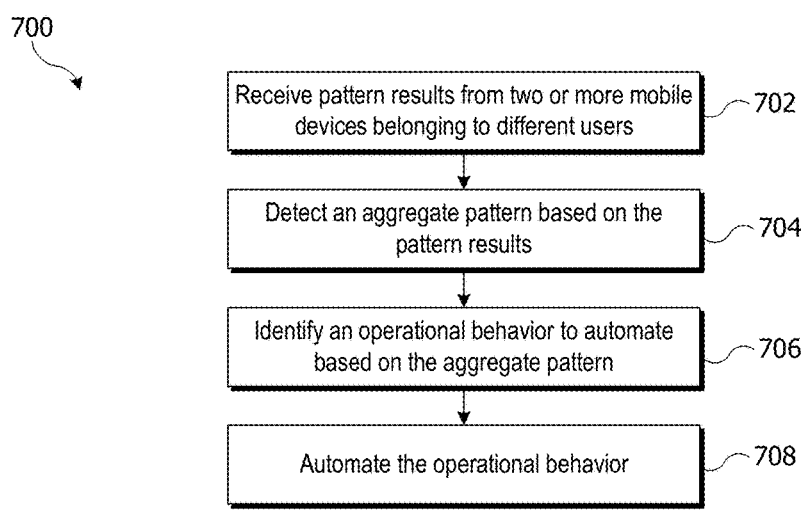
FIG. 7 is a flow diagram of a process that can be implemented in a coordinator according to an embodiment of the present invention.

FIG. 7 is a flow diagram of a process 700 that can be implemented in a coordinator, e.g., coordinator 604, according to an embodiment of the present invention.

At block 702, process 700 can receive pattern results from two or more mobile devices (e.g., mobile devices 610) belonging to different users who frequent automated environment 602 (e.g., users who reside at the location of automated environment 602). For example, the mobile devices may be devices that are regularly physically present within automated environment 602 and/or devices that regularly interact with coordinator 604 and/or accessories 606.

Figure 8A:
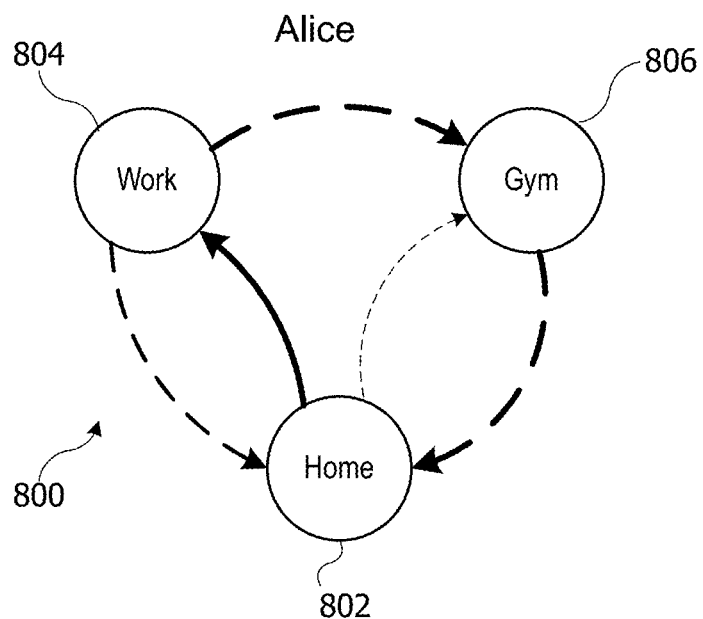
FIGS. 8A and 8B show graphs representing a pattern involving a user's movement among various key locations for two different users that can be used in an embodiment of the present invention.
Figure 8B:
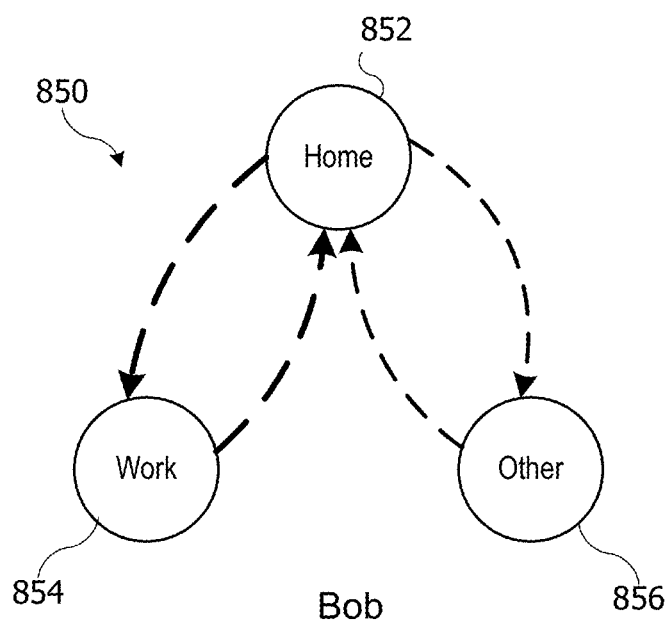

Pattern results can be received in various formats. For example, a pattern involving a user's movement among various key locations can be represented as a graph. FIGS. 8A and 8B show graphs 800, 850 respectively, for two different users, "Alice" and "Bob." Graphs 800, 850 can represent pattern results generated by the separate operation of routine modules 616 in Alice's and Bob's respective mobile devices 610. In these graphs, each node corresponds to a key location identified by a routine module and each edge represents the user moving between the locations. Each edge can have associated weights indicating, e.g., how frequently the user moves from one key location to another, at what time(s) the user is most likely to move from one location to the other, and/or how consistent the time of such movement is (edge weights are represented as different line styles and thicknesses). Graph 800 represents how user Alice moves between a "home" location (node 802), a "work" location (node 804), and a "gym" location (node 806). Graph 850 represents how user Bob moves between a "home" location (node 852), a "work" location (node 854), and an "other" location (node 856). Node 856 can represent a location that Bob visits regularly but for which a semantic label has not been identified. For instance, it might be that Bob has two jobs or that Bob works at different job locations on different days of the week.

Figure 9A:
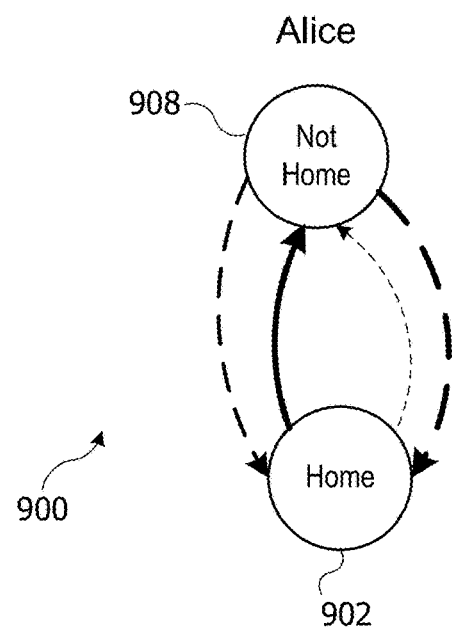
FIGS. 9A and 9B show simplified versions of the graphs of FIGS. 8A and 8B.
Figure 9B:
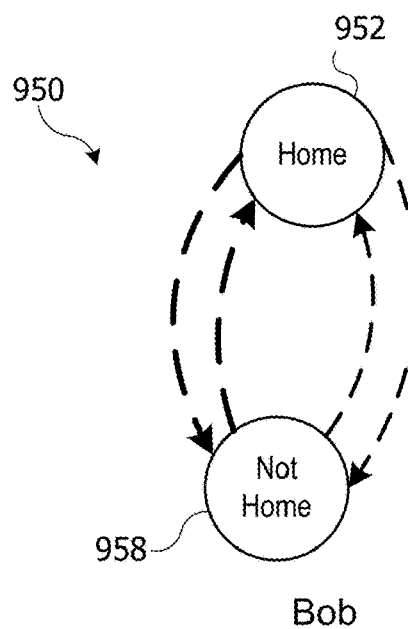

In some embodiments, pattern results can be simplified or condensed, for instance, by removing details pertaining to key locations that are outside the automated environment. For example, FIGS. 9A and 9B show graphs 900 and 950, which are simplified versions of graphs 800 and 850, respectively. The graphs have been simplified by removing information regarding key locations other than the user's home. Specifically, in graph 900 (950), home node 902 (952) corresponds to home node 802 (852), and all other nodes have been merged into a single "not home" node 908 (958). In this example, the edges are not merged, so that graphs 900, 950 can preserve information about multiple distinct patters that have been identified in the user's departures and/or arrivals. Each mobile device 610 can perform this merging on its own pattern results prior to providing a graph result to coordinator 604. This can help to protect user privacy in that coordinator 604 need not receive information about where the user goes (or what the user does) when the user leaves automated environment 602. Alternatively, if coordinator 604 can detect when mobile devices 610 enter and leave automated environment 602 (e.g., based on the devices joining or disconnecting from a wireless network), coordinator 604 can construct graphs similar to graphs 900 and 950 without other input from Alice's or Bob's mobile device.

At block 704, process 700 can analyze the pattern results to detect an aggregate pattern. The analysis can leverage the same types of pattern detection logic described above with reference to FIG. 5; the difference is that the data set on which analysis is performed includes information supplied by multiple mobile devices.

In some embodiments, the pattern analysis can include merging graphs associated with different users. For example, referring to FIGS. 8A and 8B, through the operation of pattern analysis module 622, coordinator 604 can determine that Alice and Bob reside in the same home, that is home node 802 and home node 852 both represent the same place. For example, home nodes 802 and 852 may each have associated GPS coordinates or other location identifier, and pattern analysis module 622 can determine that the location identifiers for both nodes match.

Figure 10:
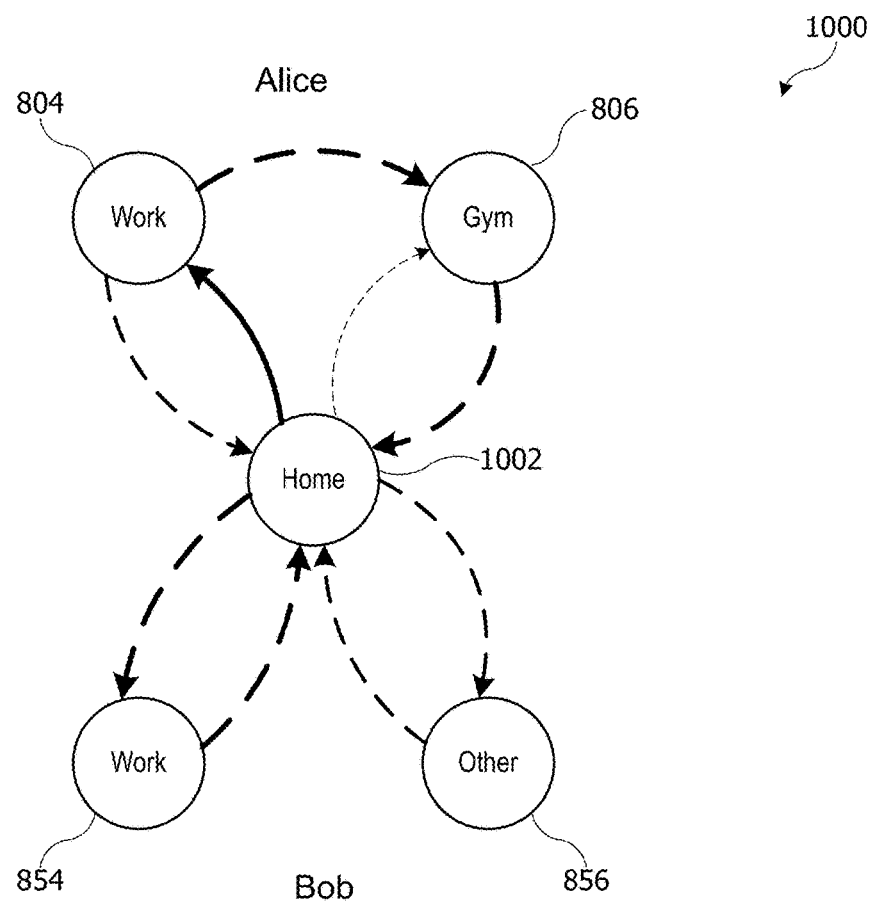
FIG. 10 shows a merged graph that can be constructed from the graphs of FIGS. 8A and 8B according to an embodiment of the present invention.

Accordingly, as shown in FIG. 10, a merged graph 1000 can be constructed, with home node 1002 being created by merging nodes 802 and 852. Similarly, referring to FIGS. 9A and 9B, pattern analysis module 622 can determine that home node 902 and home node 952 represent the same place.

Figure 11:
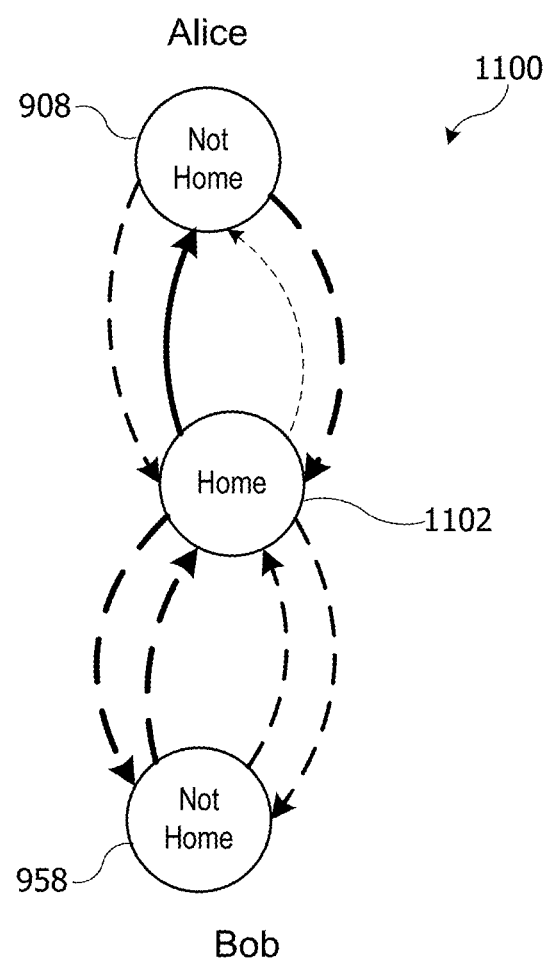
FIG. 11 shows a merged graph that can be constructed from the graphs of FIGS. 9A and 9B according to an embodiment of the present invention.

As shown in FIG. 11, a merged graph 1100 can be constructed, with home node 1102 being created by merging nodes 902 and 952. In this example, not-home nodes 908 and 958 are not merged, as this can facilitate distinguishing the patterns of different users, but other implementations can include merging the not-home nodes. An aggregate pattern can be detected based on information represented by merged graph 1000 or merged graph 1100. For example, pattern analysis module 622 can determine any or all of the following: a list of times when both Alice and Bob are routinely at home; a list of times when neither Alice nor Bob is routinely at home; a list of times when Alice is routinely at home while Bob is not; and a list of times when Bob is routinely at home while Alice is not.

At block 706, process 700 can identify an operational behavior to automate based on the aggregate pattern. For example, one automated home behavior that users may desire relates to automatically controlling a thermostat. Energy can be conserved by setting the thermostat's target temperature to a "conservation" temperature that is relatively close to the outdoor temperature, thereby reducing (or in some cases eliminating) the need to operate energy-consuming heating and cooling systems. However, such temperatures may be uncomfortably warm or cool for the residents of the home. Thus, residents may want to vary the target temperature setting of the thermostat throughout the day, for instance, by setting the target temperature to a comfortable temperature when at least one person is at home and changing the target temperature to the conservation temperature when no one is at home. If the aggregate pattern detected at block 704 includes information indicating a time period when no one is expected to be home, then at block 706, process 700 can identify a behavior of setting the target temperature to the conservation temperature during that time period and to the comfortable temperature at other times.

At block 708, process 700 can automate the operational behavior that was identified at block 706. In some embodiments, automating the behavior can include presenting a suggestion to one or more of the users to automate the behavior. For example, in the case of automating a thermostat setting, the suggestion can be presented via a prompt such as "It looks like the house is usually empty from 9:00 am to 6:00 pm on weekdays. Would you like to automatically set the thermostat to 60° during that time?" The prompt can be presented at a user interface of coordinator 604, or coordinator 604 can instruct one of mobile devices 610 to present the prompt. The user can respond to the prompt, e.g., by saying "Yes" or "No" in a voice interface or by touching or otherwise operating a graphical interface element or in some other manner. The automated behavior can be implemented (or not) based on the response to the prompt.

Process 700 is intended to be illustrative and not limiting. Many types of pattern-detection analysis and automated behavior identification can also be performed, depending on the particular pattern results received. For instance, in some embodiments, mobile devices 610 can provide more information in addition to a movement pattern such as the graphs of FIGS. 8A-8B and 9A-9B. This additional information can include information about user activities performed while the user is in automated environment 602. For example, in some embodiments, through its internal pattern analysis, mobile device 610 can determine a routine sleeping period for the user, e.g., based on indicia such as mobile device 610 being connected to a charger, mobile device 610 being at rest on a surface and experiencing no user interaction for an extended period, operation of a "do not disturb" function, physiological measurements of the user such as pulse or respiration rates, or the like. Information characterizing the routine sleeping period (e.g., period begins between 10:30 pm and midnight; period ends between 6:30 am and 7:00 am) can be provided to coordinator 604. Other examples of routine activities that can be identified in a home environment can include exercising (if the user regularly performs exercises at home), cooking (e.g., based on interacting with accessories identified as kitchen appliances), consuming media (e.g., watching TV or listening to music), operating various appliances (e.g., doing laundry), occupying particular rooms (e.g., being in proximity to a particular accessory in the environment), and so on.

Where activity information is provided by mobile devices 610, coordinator 604 can detect aggregate patterns pertaining to user activities within automated environment 602. For example, coordinator 604 can identify time periods when all occupants of a home are routinely asleep and time periods when all residents are routinely awake and can identify actions that should be performed during such time periods (e.g., making sure doors are locked at the time when the residents are routinely asleep, scheduling a loud appliance to operate during a time when the residents are routinely awake, etc.). Coordinator 604 can also detect patterns that suggest interactions between the residents. For example, if the mobile devices of two residents routinely spend overlapping time periods in the same room, it is likely that the residents are interacting with each other during those periods.

In some embodiments, coordinator 604 can gather accessory interaction data, with or without identification of which controller interacted with the accessory. For example, in embodiments where controllers (e.g., mobile device 610) communicate with accessories 606 indirectly via coordinator 604, coordinator 604 can log some or all of the accessory-interaction messages received from or sent to various controllers. The log entry can include: an identifier of the controller (or of a user of the controller); location information for the controller (e.g., whether the controller communicates via a local network, indicating that the controller is within automated environment 602, or a wide-area network, indicating that the controller is not within automated environment 602); a record of which accessory 606 was interacted with; a record of message(s) sent by the controller to the accessory (and vice versa); the time of the interaction; and so on. In some embodiments, such as where controllers can communicate directly with accessories 606, accessories 606 can report their interactions with various controllers to coordinator 604, and coordinator 604 can log accessory interaction data based on accessory reports in addition to or instead of relying on communications from a controller. Further, if a user operates one of accessories 606 manually (e.g., by flipping a physical light switch instead of using a controller to change the power state), accessory 606 can report to coordinator 604 that it was operated manually. Depending on implementation, it might or might not be possible to determine which user performed a manual operation. For instance, if automated environment 602 includes presence or proximity sensors, it may be possible to determine which user was in proximity to coordinator 604 at the time of the operation.

Where accessory interaction data is available, coordinator 604 can detect patterns by correlating accessory interactions with user location or user activity patterns determined from the pattern results provided by the users' mobile devices. For example, coordinator 604 may be able to detect a pattern that when Bob comes home first, he routinely turns on the TV, but if Alice comes home first, Bob does not turn on the TV when he comes home. Such a pattern may not be detectable just from the data available from Bob's mobile device (even if Bob's mobile device knows when Bob turns on the TV) but can become detectable when combined with data available from Alice's mobile device. Thus, aggregating data across users can enable more intelligent automation of a shared environment. Such a situation is an example of identifying an accessory interaction that a first user of the users routinely performs when the first user is alone in the automated environment, but does not routinely perform when another user is present in the automated environment. The operational behavior to automate can include performing the accessory interaction when the first user is alone in the automated environment.

Coordinator 604 can detect a variety of patterns, including but not limited to: the most likely time for users to operate a particular accessory; the most likely interactions for users to perform with a particular accessory; time periods when all users (or particular users) of automated environment 602 are likely to be present; time periods when all users (or particular users) of automated environment 602 are likely to be absent; time periods when various users sleep; and so on. To the extent that coordinator 604 has information about where accessories are located within automated environment 602 (e.g., which accessories are located in particular rooms or zones as described in above-referenced U.S. patent application Ser. Nos. 14/725,891 and 14/725,912), coordinator 604 can also determine patterns of occupancy of various rooms or other specific locations within automated environment 602. In some embodiments, coordinator 604 can identify specific groups of accessories as being physically or logically related, e.g., based on patterns where one user routinely interacts with the accessories in the group at proximate times or in a particular sequence. For instance, a user might routinely turn on the TV and shortly thereafter turn off or adjust a light in the room in order to see the screen better, and coordinator 604 can detect the correlation between these operations and infer a relationship. As another example, a user in the kitchen may interact with various accessories located in the kitchen (e.g., kitchen lights, stove controls, refrigerator, dishwasher) at around the same time, which can lead to an inference that these accessories are related.

Based on aggregation of user routines (and other available data about the automated environment), a coordinator can identify various behaviors that can be automated. In some embodiments, the coordinator can also make other recommendations, such as recommending optimum settings or operational profiles for various accessories based on an aggregate pattern of accessory use; recommending changes in user behavior that may improve energy efficiency, reduce water use, or reduce expenses; and so on.

To further illustrate aggregation of user routines, specific use-case examples will now be described. Any or all of these use-cases can be implemented in combination, and these examples are not intended to be exhaustive.

VI. Use Cases

A. Use-Case 1: Heating or Cooling Profiles

As noted above, it may be desirable to automate setting of a target temperature of a home thermostat so that it varies based on the presence or absence of residents. For example, when no one is home, it may be desirable to set the target temperature to a conservation temperature that is not particularly comfortable for the occupants of the home. When one or more residents come home, the target temperature can be changed to a comfortable temperature.

Comfort is, of course, a matter of individual preference, and different residents of the same home may have different opinions as to what is a comfortable temperature. For instance, resident Alice may find a temperature of 72° F. comfortable, while resident Bob prefers a somewhat cooler temperature of 68° F. This information can be provided to a coordinator of the automated home environment. In some embodiments, each resident can directly communicate a preferred temperature to the coordinator. In other embodiments, the coordinator can infer each resident's preferred temperature, e.g., by detecting patterns in where the thermostat is set when each resident is home alone.

A coordinator can combine its knowledge of each resident's preferred temperature with information about when various residents are likely to be at home (which can be determined in accordance with process 700 described above) to produce a thermostat setting profile. For example, at times when no one is likely to be home, the target temperature can be set to a conservation temperature. At times when Alice is likely to be home alone, the target temperature can be automatically set to 72° F.; when Bob is likely to be home alone, the target temperature can be automatically set to 68° F.; and when both Alice and Bob are likely to be home, the target temperature can be automatically set to a "compromise" temperature (e.g., 70° F., the average of Alice's and Bob's preferred temperatures). In some instances, a coordinator can define an operating profile for a heating or cooling system to achieve the target temperatures at the appropriate times. Thus, residents can consistently experience an acceptable temperature without the effort of manually programming a thermostat.

B. Use-Case 2: Actions Taken on Occupancy Transitions

Another example of an aggregate pattern that can be detected relates to occupancy transitions (e.g., last person to leave, first person to return). For instance, in some neighborhoods it may be considered safe and desirable to leave a garage door open when occupants of a house are present, but not safe when the house is empty. Accordingly, the residents who inhabit an automated home environment may have established a policy that the last resident to leave closes the garage door (if it is open).

A coordinator can detect this aggregate pattern by correlating closing of the garage door with a transition from an occupied state (at least one resident at home) to an unoccupied state (no residents at home). A pattern of transitions to the unoccupied state can be detected based on the aggregated location pattern results from the residents' mobile devices, and the state of the garage door can be determined based on information provided by a garage-door accessory. In this example, the aggregate pattern might not be detectable by any one resident's mobile device, e.g., if no one resident is consistently last to leave. However, by aggregating the data from the residents' mobile devices, the coordinator can detect the pattern. Once the pattern is detected, the coordinator can suggest automating this behavior, e.g., by establishing an automation rule to instruct the garage door to close whenever a transition from an occupied state to the unoccupied state is detected. Thus, the aggregate pattern can include a correlation between an accessory interaction and a transition in an occupancy state of the automated environment from an occupied state to an unoccupied state. And, the aggregate pattern can include a correlation between an accessory interaction and a transition in an occupancy state of the automated environment from an unoccupied state to an occupied state.

Other patterns associated with an occupancy transition can be detected, such as turning lights on or off, locking or unlocking doors, operating appliances (e.g., the last resident to leave in the morning may be responsible for starting the dishwasher, or the first resident to return home in the evening may be responsible for turning on the oven to cook dinner), or the like.

C. Use-Case 3: Actions Taken Based on Combination of Occupants

As noted above, a resident of a home may behave differently depending on who else is at home. For instance, if Bob comes home when no one else is there, he may turn on the TV, but if someone else (e.g., Alice) is there, he may prefer to leave the TV off and interact with Alice. Such patterns may not be detectable by Bob's device, as it may not have information pertaining to the comings and goings of other residents of the home. But such patterns can be detected by aggregating patterns of the various residents in the manner described above.

Once any aggregate pattern is detected, it can be automated (e.g., using an automation rule as described above). For instance, if the coordinator detects that Bob has come home and no one else is there, the coordinator can automatically turn on the TV or present a prompt to Bob asking if Bob would like to turn on the TV.

D. Other Examples of Using Aggregate Patterns

The examples of aggregate patterns and their uses given above are intended to be illustrative and not limiting. Any type of aggregate pattern can be detected and used to implement an automated behavior. For example, there may be a pattern that the last resident to go to bed turns off the lights and makes sure exterior doors are closed and locked, even though there is not a consistent pattern of which resident is last to go to bed, and automation can be based on detecting when the last resident goes to bed or on a typical time at which all residents are routinely in bed.

Embodiments of the present invention are not limited to home environments. For example, in a workplace environment, a coordinator can aggregate information about when workers arrive and leave and can implement automated heating, cooling, and/or lighting schedules based on this information. This can reduce the need for employees who habitually work outside of standard business hours to request after-hours heating, cooling, and/or lighting.

As another example, patterns can be detected among a group of users who frequent a common environment. For instance, in the workplace, it may be possible to detect patterns such as where or when the workers are likely to go for lunch or what nearby gyms they frequent. This can be used, e.g., to make recommendations to workers who might not be familiar with the area or who might be looking for new places to try.

Still other examples will be apparent to those skilled in the art with access to the present disclosure.

VII. Further Embodiments

While the invention has been described with respect to specific embodiments, one skilled in the art will recognize that numerous modifications are possible. Controller networks and/or accessory networks can include as many or as few devices as desired. Use of a coordinator is not required; regardless of the number of accessories or number of controllers, it is always possible (at least in principle) to establish pairings between each controller and each accessory and to have all controllers operate by controlling accessories directly.

Further, where a coordinator is present, it can be but need not be the case that all controllers are permitted to access all accessories via the coordinator. For instance, some controllers might be restricted from accessing accessories when not within the local environment, and some accessories might require that controllers access them directly rather than through a coordinator.

In addition, while the foregoing description makes reference to a home as an example of an environment that can be automated, embodiments of the invention are not limited to the home environment. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc.

Similarly, some embodiments are described in connection with a single user or a single mobile controller device. It is to be understood that a home (or other automated environment) can have multiple occupants using multiple controller devices, and the techniques described herein can be applied with respect to any or all of the occupants (users) and controllers that may be associated with a given automated environment. In some examples described above, mobile controllers can provide user-specific data (e.g., pattern results) to a coordinator in the automated environment. In some embodiments, users can opt out of sharing data with the coordinator or select the amount of data to be shared. In the interest of protecting privacy, the coordinator can retain user-specific data locally (e.g., data need not be backed up to the cloud) and store the data securely (e.g., using encryption or the like). In addition, retention of received data can be limited such that only recent user-specific data or environment-level pattern data is stored. For example, the coordinator can be configured to store only the most recent user-specific data from a particular device and to discard environment-level pattern or routine data for a fixed length of time (e.g., four months, eight months, etc.).

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of using a coordinator device in an automated environment that includes a plurality of accessories controllable, via accessory interactions, by a plurality of mobile devices belonging to a plurality of users who frequent the automated environment, the method comprising:

receiving, at the coordinator device, respective pattern results from each of two or more of the plurality of mobile devices, wherein the pattern results from the two or more of the plurality of mobile devices represents a first pattern of using a first mobile device to control a first subset of the plurality of accessories and a second pattern of using a second mobile device to control a second subset of the plurality of accessories;

analyzing, by the coordinator device, the received pattern results;

detecting an aggregate pattern across the users of the two or more of the plurality of mobile devices, wherein the aggregate pattern comprises the pattern results from the first mobile device being used to control the first subset of the plurality of accessories in relation to pattern results from the second mobile device being used to control the second subset of the plurality of accessories, and wherein the aggregate pattern includes a correlation between locations of the users of the two or more of the plurality of mobile devices and an accessory interaction;

identifying, by the coordinator device, an operational behavior of one or more of the plurality of accessories to automate based on the aggregate pattern that is detected; and automating the operational behavior of the one or more of the plurality of accessories in accordance with the detected aggregate pattern across the two or more of the plurality of mobile devices.

2. The method of claim 1, wherein automating the operational behavior includes:
presenting a suggestion to a first user of the users to automate the operational behavior; and
automating the operational behavior in response to the first user accepting the suggestion.

3. The method of claim 1, wherein the received pattern results include a location pattern result indicating when a first user of a first mobile device routinely leaves the automated environment and when the first user routinely arrives at the automated environment.

4. The method of claim 1, wherein the received pattern results include activity information characterizing an activity that a first user of a first mobile device routinely performs while in the automated environment.

5. The method of claim 4, wherein the activity includes interacting with one or more of the plurality of accessories.

6. The method of claim 4, wherein the activity that the first user of the first mobile device routinely performs while in the automated environment includes sleeping.

7. The method of claim 1, further comprising:
receiving, at the coordinator device, accessory interaction information from the plurality of accessories about accessory interactions of accessories with the two or more of the plurality of mobile devices.

8. The method of claim 1, wherein the aggregate pattern includes a correlation between an accessory interaction and a transition in an occupancy state of the automated environment from an occupied state to an unoccupied state.

9. The method of claim 1, wherein the aggregate pattern includes a correlation between an accessory interaction and a transition in an occupancy state of the automated environment from an unoccupied state to an occupied state.

10. The method of claim 1, wherein the aggregate pattern includes a correlation between an accessory interaction and presence in the automated environment of a particular subset of the users of the two or more of the plurality of mobile devices.

11. The method of claim 1, wherein automating the operational behavior includes:
establishing an automation rule that includes:
a triggering condition detectable by the coordinator device, and
an accessory action to be initiated in response to detecting the triggering condition.

12. The method of claim 11, wherein the triggering condition is based on a specific subset of the users being present in the automated environment, and wherein the coordinator device determines which of the users are currently in the automated environment based on signals from the plurality of mobile devices.

13. The method of claim 1, wherein detecting the aggregate pattern includes identifying a time period during which the automated environment is routinely unoccupied.

14. The method of claim 13, wherein the operational behavior to automate includes setting a target temperature of a thermostat to a conservation temperature during the time period and setting the target temperature of the thermostat to a comfortable temperature for times outside the time period.

15. The method of claim 14, wherein the operational behavior to automate further includes selecting the comfortable temperature based on which of the users are present in the automated environment.

16. The method of claim 1, wherein detecting the aggregate pattern includes:
identifying an accessory interaction that a first user of the users routinely performs when the first user is alone in the automated environment but does not routinely perform when another user is present in the automated environment.

17. The method of claim 16, wherein the operational behavior to automate includes performing the accessory interaction when the first user is alone in the automated environment.

18. The method of claim 1, wherein the automated environment is a home environment.

19. An electronic device comprising:
a communication interface to communicate with a plurality of accessories in an automated environment and to communicate with a plurality of mobile devices associated with a plurality of users who frequent the automated environment, the plurality of accessories controllable by the plurality of mobile devices; and
a processor coupled to the communication interface and configured to:
receive respective pattern results from each of two or more of the plurality of mobile devices, wherein the pattern results from the two or more of the plurality of mobile devices represents a first pattern of using a first mobile device to control a first subset of the plurality of accessories and a second pattern of using a second mobile device to control a second subset of the plurality of accessories;
analyze the received pattern results;
detect an aggregate pattern across the users of the two or more of the plurality of mobile devices, wherein the aggregate pattern comprises the pattern results from the first mobile device being used to control the first subset of the plurality of accessories in relation to the pattern results from the second mobile device being used to control the second subset of the plurality of accessories, and wherein the aggregate pattern includes a correlation between locations of the users of the two or more of the plurality of mobile devices and an accessory interaction;

identify an operational behavior of one or more of the plurality of accessories to automate based on the aggregate pattern that is detected; and automate the operational behavior of the one or more of the plurality of accessories in accordance with the detected aggregate pattern across the two or more of the plurality of mobile devices.

20. The method of claim 1, wherein the first mobile device is controlled by a first user and the second mobile device is controlled by a second user that is different from the first user.

21. The method of claim 1, wherein the first subset of the plurality of accessories and the second subset of the plurality of accessories include a same one or more accessories.

22. The method of claim 1, wherein a location of a user corresponds to an area in the automated environment that is occupied by the user.

* * * * *